United States Patent [19]
Roth

[11] 3,776,353
[45] Dec. 4, 1973

[54] THREE WHEELED MOTOR VEHICLE

[76] Inventor: Edward Roth, Box 511, Maywood, Calif. 90270

[22] Filed: Apr. 12, 1971

[21] Appl. No.: 133,170

[52] U.S. Cl............ 180/27, 280/202, 280/274, 280/282, 296/64, 297/243, D14/3, D90/8
[51] Int. Cl............................................ B62d 61/08
[58] Field of Search................ 180/27, 25, 26 R; 280/273, 282; D90/8, 8.1; D14/3; 297/243

[56] References Cited
UNITED STATES PATENTS

| 3,062,559 | 11/1962 | Hewitt | 280/282 X |
| 516,902 | 3/1894 | Smith | 280/291 |
| 3,650,344 | 3/1972 | Plessinger | 180/27 |
| 2,789,831 | 4/1957 | Verik | 280/282 X |
| 2,009,571 | 7/1935 | Anderson | 280/282 |
| 1,662,718 | 3/1928 | Regard | 297/243 X |
| 93,030 | 7/1869 | Wortmann | 280/273 X |
| 3,269,773 | 8/1966 | O'Connor | 297/243 X |
| 2,320,210 | 5/1943 | Bender | 297/243 X |
| 3,352,597 | 11/1967 | Barenyi | D14/3 UX |
| 3,550,948 | 12/1970 | Thompson, Jr. | D14/3 UX |

FOREIGN PATENTS OR APPLICATIONS

| 459,759 | 10/1950 | Italy | 180/27 |
| 455,780 | 2/1927 | Germany | 180/27 |
| 112,684 | 11/1928 | Austria | 297/243 |
| 537,464 | 12/1955 | Italy | 280/273 |

*Primary Examiner*—Kenneth H. Betts
*Assistant Examiner*—John P. Silverstrim
*Attorney*—William P. Green

[57] ABSTRACT

A motor vehicle having two spaced rear wheels and a single centered front wheel mounted for steering movement, with the frame and body of the device having relatively wide rear portions between the two wheels carrying and enclosing a driving motor, and having narrower forwardly projecting portions carrying a driver's seat at a location at which the driver's legs straddle those portions, with the forwardly projecting portion of the frame extending upwardly toward its forward end to connect pivotally to a fork mounting the front wheel. A second seat is desirably located back of and at a lever higher than the driver's seat, with the driver's seat preferably being located lower than, and the second seat preferably being located higher than, the level of the tops of the rims of the rear wheels.

14 Claims, 5 Drawing Figures

PATENTED DEC 4 1973
3,776,353
SHEET 1 OF 2
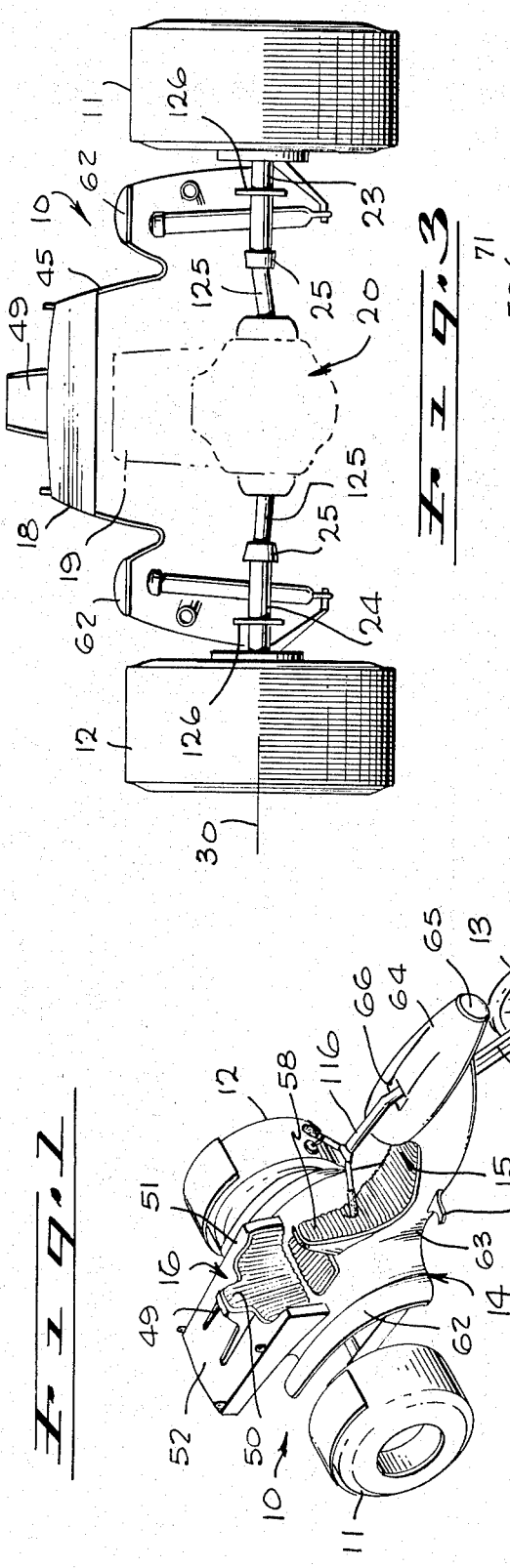
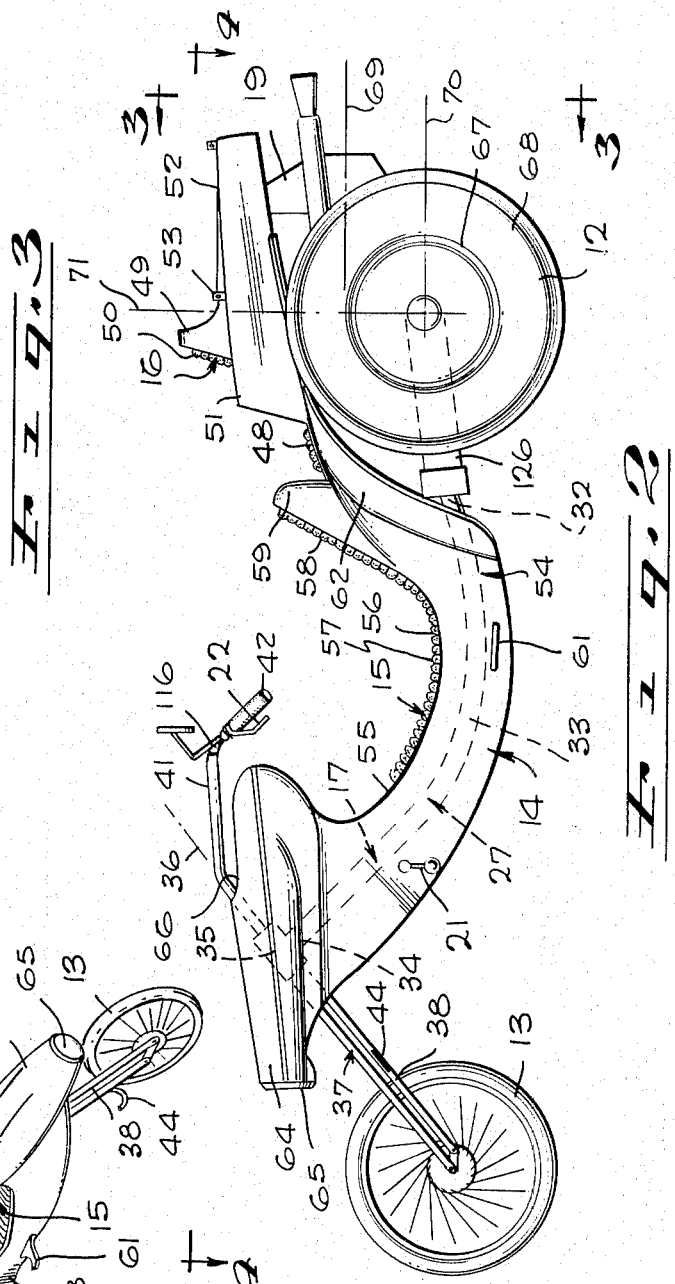
EDWARD ROTH
INVENTOR.
BY
William P Green
ATTORNEY

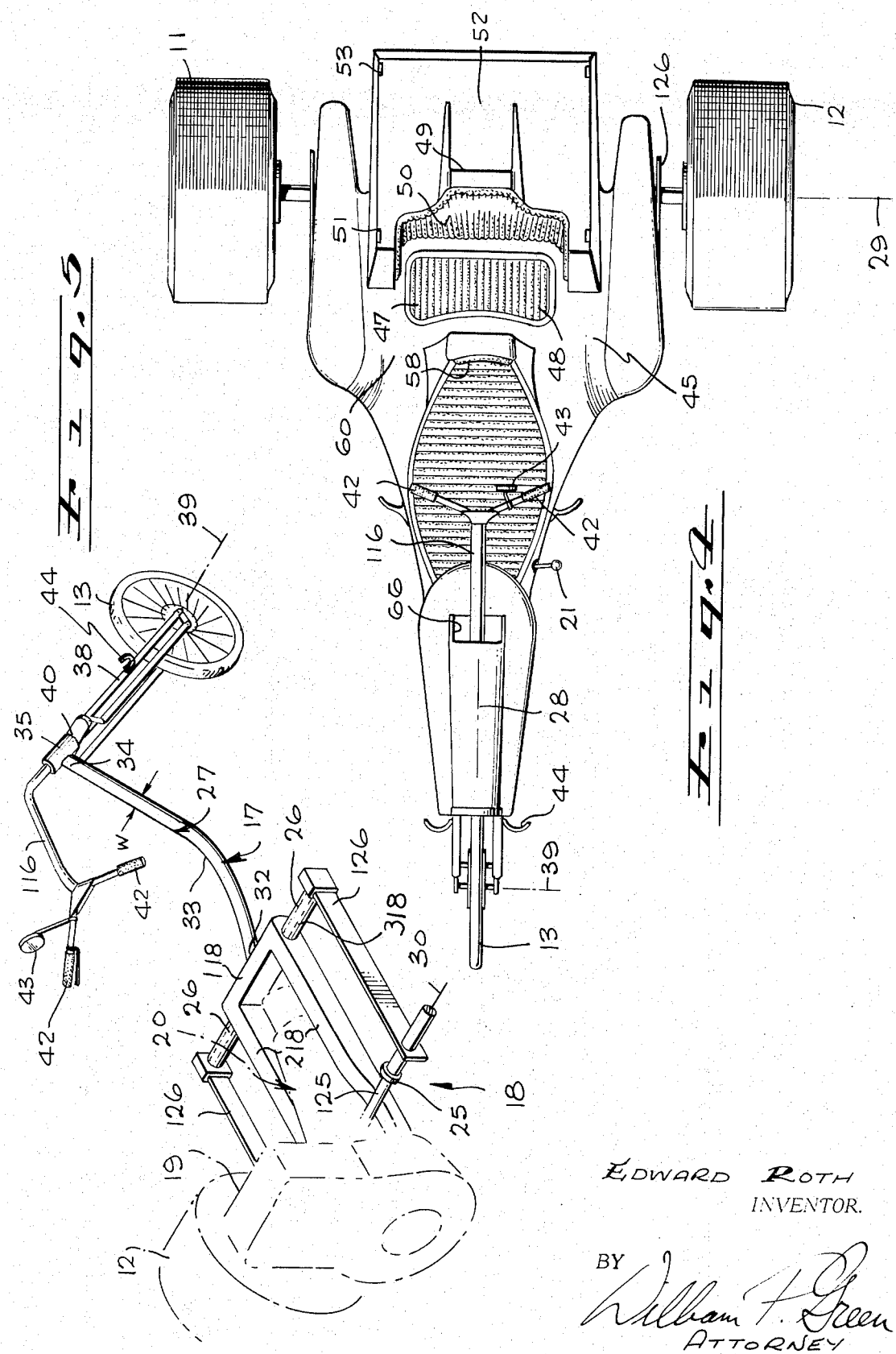

THREE WHEELED MOTOR VEHICLE

BACKGROUND OF THE INVENTION

This invention relates to improved vehicles of the three wheeled type, having two relatively widely spaced power driven rear wheels and a centered single forward steering wheel.

In the past, various types of three wheeled vehicles have been devised, but all of those of which I am aware have had very poor handling characteristics and stability in use. More particularly, because of the contact of the wheels with a road surface at only three locations, vehicles of this type have been difficult to design in a manner assuring their stability against overturning while in motion, and particular when turning. Their methods of construction have inherently required positioning of the frame and body of the vehicle, as well as the weight of the driver and/or other passengers, so high relative to the wheels and the road surface as to introduce a decided danger of overturning of the vehicle when even a relatively slight turn is made. Consequently, these three wheeled vehicles have seen only limited use, for for low speed special situations, as for instance in golf carts, mail delivery trucks, and so forth.

SUMMARY OF THE INVENTION

The present invention provides a novel three wheeled vehicle which overcomes the disadvantages of the prior three wheeled devices of which I am aware, and which in particular achieves vastly improved operational stability under much higher speed conditions and more abruptly turning conditions than has been possible with such prior vehicles. My arrangement enables the center of gravity of the vehicle and its driver to be extremely low and very close to the road surface, while still maintaining a required minimum clearance between the lowermost portion of the vehicle and that road surface. At the same time, the driver is given very full and free visibility in all directions, in spite of the low center of gravity. Further, a passenger in addition to the driver may be carried at a location minimizing any adverse effect on the handling characteristics of the vehicle which might be caused by the weight of this passenger, and also locating the passenger to himself have very wide and free visibility. In addition, the vehicle is so constructed as to be simple in manufacture, and therefore low in cost of production.

Structurally, the vehicle includes a frame having a rear portion which is located between the two rear wheels, and which may carry the motor of the device for driving those rear wheels, and with the frame also having a forwardly projecting portion connecting the rear portion of the frame and the rear wheels to the front wheel. This forwardly projecting portion is centered with respect to the rear wheels and may have a very low portion received very near the road surface, and a forward portion extending to a higher level for connection to and mounting of a fork by which the front wheel is carried. The driver's seat may then be located above the low portion of the frame, with the driver's legs received at opposite sides of the forwardly projecting portion of the frame. Foot rests are carried by the vehicle for the driver's feet to rest on, and preferably are attached to the fork of the front wheel to assist in steering the vehicle. Desirably, the driver's seat is located at a level beneath the uppermost portions of the rims of the rear wheels.

The second seat, for the passenger, may be located directly behind the driver's seat, but at a higher level enabling the passenger to see over the top of the driver's head and therefore have free visibility. A projection extending upwardly from the body of the vehicle in front of the passenger may serve as a seat back for the driver.

BRIEF DESCRIPTION OF THE DRAWINGS

The above and other features and objects of the invention will be better understood from the following detailed description of the typical embodiment illustrated in the accompanying drawings, in which:

FIG. 1 is a perspective view of a three wheeled vehicle embodying the invention;

FIG. 2 is an enlarged side view of the vehicle;

FIG. 3 is a rear view taken on line 3—3 of FIG. 2;

FIG. 4 is a plan view taken on line 4—4 of FIG. 2; and

FIG. 5 is a perspective representation of the frame and some of the other parts of the vehicle, with most of the outer body removed for clarity.

DESCRIPTION OF THE PREFERRED EMBODIMENT

Referring first to FIG. 1, I have illustrated at 10 a vehicle embodying the invention and having two spaced rear wheels 11 and 12 and a single forward steerable wheel 13. The body 14 of the vehicle carries a driver's seat 15 and a rear passenger's seat 16. A steering tiller bar or handle lever 116 is utilized for turning the front wheel 13 to steer the vehicle.

The frame 17 of the vehicle (see FIG. 5) includes a rear relatively wide portion 18 located between and supported by the two rear wheels 11 and 12 with portion 18 typically including a front cross piece 118, two spaced rearwardly projecting frame elements 218, and two laterally projecting tubes 318 containing a pair of torsion bars 26. A preferably air cooled small typically gasoline engine 19 is mounted to the upper side of rear portion 18 of the frame, and is connected to wheels 11 and 12 in driving relation through a transmission, clutch and differential mechanism represented at 20. This mechanism or group of mechanisms 20, as well as engine 19, are controlled by the driver through control elements which may include a gear shifting lever 21 and handle bar engine controls 22 of the type conventionally provided on motorcycles. The rear axle structure of the vehicle may be of the type conventionally referred to as a "split axle," having two individual axles 23 and 24 (FIG. 3), connected to the frame for pivotal movement downwardly and upwardly about their inner ends 25, and carrying and driving the two wheels 11 and 12 at their outer ends, with both of these axles 23 and 24 being driven by the differential portion of mechanism 20 through two shafts 125. Appropriate springs are provided between the wheels and rear frame portion 18, to allow for cushioning of the ride of the vehicle, with these springs preferably including the previously mentioned torsion bars 26 twisting about a transverse axis and actuating axles 23 and 24 through two rearwardly projecting arms 126.

In addition to its rear portion 18, frame 17 has a forwardly projecting rigid portion 27, which is centered with respect to the rear wheels, and lies essentially in a central vertical front to rear plane 28 disposed perpendicular to the vertical transverse plane 29 within which the horizontal axis 30 of the rear wheels lies. The frame portion or element 27 is very narrow in a transverse direction, and preferably is formed as a rigid metal pipe, whose transverse width w (perpendicular to longitudinal central plane 28) is very small as compared with the transverse width of rear rigid portion 18 of the frame. The back end of frame element 17 is connected rigidly at 32 to the front of rear frame portion 18, as by bolting or welding the parts together at this location.

In extending forwardly from the location 32, element 17 may first extend substantially horizontally for a short distance, as to the location 33 of FIG. 2, and may then extend gradually and progressively upwardly to its forward end 34 at which a front wheel mounting bearing 35 centered about an inclined axis 36 is carried by element 17.

The front wheel may be mounted by a fork or yoke 37, having parallel spaced arms 38 received at opposite sides of the wheel and connected to appropriate bearings rotatably mounting the front wheel to turn about its axis 39. At their upper ends, arms 38 are connected to a single mounting portion 40 of the fork, which is journaled within bearing 35 to turn about axis 36, and is also retained by that bearing against relative axial movement. The upper end of the fork is connected to tiller bar 116, which extends rearwardly and substantially horizontally at 41, and then curves downwardly to form a pair of oppositely directed steering handles 42 having handle grips adapted to be grasped by the two hands of the driver. The engine controls and any other appropriate controls 22 may be mounted in conventional manner to the steering handles, as may a laterally projecting rear view mirror 43. Two foot rests 44 may be carried by the fork arms 38, and project laterally therefrom in opposite directions, desirably at locations slightly upwardly beyond the point at which the periphery of the front wheel tire passes through the fork, to support the 2 feet of the driver and enable him to assist in turning the fork by his feet.

To describe now the body 14 of the vehicle, this body is preferably formed of fiberglass, that is, glass cloth impregnated and coated with a hard polymerized resinous plastic material, such as a suitable epoxy resin. The body is molded to the illustrated shape, and is suitably secured to the previously discussed frame in any convenient manner. At a location between the rear wheels 11 and 12 of the vehicle, body 14 has a relatively wide generally horizontally extending rear portion 45, which extends over and covers the rear portion 18 of the frame 17 and engine 19. This rear portion 45 of the body is so shaped as to define the previously mentioned driver's seat 15 and passenger's seat 16.

Seat 16 has an upwardly facing essentially horizontal seat surface 47, which may be suitably cushioned by provision of a cushion 48 secured to the upper surface of the body. Behind this cushion 48, an upwardly projecting section 49 of the rear portion of the body may form a recess defining a rearwardly inclined seat back 50 and two opposite side arm rests 51 of the seat 16, with both the seat back and the arm rests desirably being cushioned as shown. Behind the seat back, portion 45 of the body has a substantially horizontal surface 52 on which baggage may be carried, and typically be retained by straps extending across the top of the baggage and detachably connected to or extending through openings in suitable brackets 53 secured to the body. Two such brackets may be provided at each side of the baggage area, one located near the rear of that area and the other located near the front of the area.

In extending forwardly from its rear relatively wide portion 45, the body 14 narrows substantially to form a reduced width forwardly projecting portion 54 of the body on which the driver sits. This portion 54 is centered with respect to wheels 11 and 12, and thus with respect to the central vertical plane 28 of the vehicle, and extends about and encloses the top and opposite sides of frame member 27. The upper surface 55 of portion 54 curves gradually upwardly as it advances forwardly, in general correspondence with the upward extension of frame member 27, and toward the location at which the fork of the front wheel is connected to frame member 27. This surface 55 carries at its lowest rearmost portion a driver's seat cushion 56, which may extend across substantially the entire width of surface 55, and which defines an upwardly facing surface 57 on which the driver sits. At the back of this seat region, the molded fiberglass body forms an upwardly curving forwardly facing inclined seat back surface 58 along which the cushion 57 continues upwardly to provide a cushioned back against which the driver may lean rearwardly. In order that this seat back may extend upwardly far enough for maximum comfort, the body is molded to form a projection 59 at the top of the seat back which extends upwardly beyond the level of the upper surface of the rear seat cushion 48, and is located directly in front of and centered with respect to that rear seat cushion. At opposite sides of projection 59, the body forms downwardly curving surfaces 60 along the upper side of which the legs of a passenger sitting in seat 46 may extend with his feet resting on two foot rests 61 projecting laterally from the narrow portion 54 of the body at opposite sides of and beneath the front seat 57. The outermost portions of the body adjacent surfaces 60 may be raised slightly as seen at 62, to assist in forming effective shields between the driver's legs and the rear axle and wheel areas, and thus prevent injury to the passenger by any rocks or the like that might otherwise be thrown forwardly toward his legs.

The opposite sides of the narrow portion 54 of the body may be defined by two generally vertical opposite side walls 63 of that portion, extending downwardly from top wall 55 and curving gradually upwardly in correspondence therewith as the body extends forwardly. The passenger's foot rests 61 are secured in appropriate manner to these opposite side walls 63 of narrow portion 54 of the body.

At and about the juncture of frame member 27 with the upper end of wheel mounting fork 37, the molded body may have an enlarged forward portion 64, which may be centered with respect to the main front to rear vertical center plane 28 of the vehicle, and may be elongated in a front to rear direction. At the forward end of this enlargement 64, there is mounted a front light 65, essentially above the location of the front wheel. Enlargement 64 is in front of the driver but low enough to avoid obstruction of his line of sight, and is somewhat wider than the narrowest portion 54 of the body. At approximately its center, enlargement 64 contains an opening 66 at the location of the upper end of fork 37, and through which the sterring tiller bar 116 is connected to the fork for turning the front wheel.

Much of the stability and maneuverability of the vehicle is attained by virtue of the very low positioning of the driver relative to the wheels and other portions of the vehicle, and consequently relative to the center of gravity of the vehicle. Specifically, to define the level of the driver's seat with respect to the rear wheels 11 and 12, and their rims 67 which carry the rear tires 68, it is preferred that the lowermost portion of the upwardly facing seat surface 57 of the driver's seat be located at a level beneath that of a horizontal plane 69 (FIG. 2) extending through the uppermost portion of the rims 67 of the rear wheels. Optimally, the lowermost portion of seat surface 57 may be located closer to the level of a horizontal plane 70 extending through the axes 30 of the rear wheels than to the previously discussed rim top plane 69. The lowest portion of the passenger's seat cushion 48 should be at a level substantially higher than the lowest portion of the driver's cushion, and preferably above the level of plane 69, to enable the passenger to easily see over the head of the driver and thus have full visibility. Also, it is preferred that the major portion and preferably all of the forwardly facing seat back surface 50 be located in front of a vertical transverse plane 71 extending through the rear wheel axis 30, in order to position the weight of the passenger as well as the driver forwardly of this plane and thus assist in keeping the front wheel down and in engagement with the surface of the road even under rapid acceleration conditions.

In using the vehicle, a driver may position his body comfortably on the driver's seat cushion, and in that position has free access to the steering handle bars and the controls carried thereby, as well as the gear shift control 21. His weight is so low as to prevent any tendency for the vehicle to turn over even when making abrupt turns. The rear passenger, whose weight will normally be less than the driver, is at a higher level to assure his or her full visbility, and yet is centered between the rear wheels to avoid overturning of the vehicle as a result of his somewhat elevated weight. Also, as previously stated the weights of both the driver and passenger are located forwardly of the plane 71 of the rear wheel axis in order to maintain the front wheel continuously in engagement with the road.

While a certain specific embodiment of the present invention has been disclosed as typical, the invention is of course not limited to this particular form, but rather is applicable broadly to all such variations as fall within the scope of the appended claims.

I claim:

1. A motor vehicle comprising two rear wheels spaced laterally apart and having rims and tires mounted on the rims, a front wheel located forwardly of said rear wheels and essentially centered with respect thereto; a rigid structure supported by said three wheels and having a rear portion between said two rear wheels; said rigid structure having a forward portion which is narrow as compared with the spacing between said rear wheels and essentially centered with respect thereto and which extends forwardly and upwardly to a forward wheel mounting location; a fork carrying said front wheel rotatably; a pivotal connection mounting said fork to said forward portion of said rigid structure at said wheel mounting location for pivotal steering movement about a steering axis; said fork and said steering axis being inclined downwardly and forwardly from said pivotal connection at which the fork is connected to said rigid structure; steering means for turning said fork about said inclined steering axis; a seat supported on said rigid structure at a location forwardly of said rear wheels and rearwardly of said front wheel and having an upwardly facing seat surface on which a driver may sit at a location to manipulate said steering means; said upwardly facing seat surface being so located that a person sitting thereon straddles said forward portion of said rigid structure with his two legs received at opposite sides thereof; and a motor carried by said rigid structure at a location behind said seat and adapted to drive at least one of said rear wheels; said upwardly facing seat surface having a lowermost portion located at a level which is at least approximately as low as a horizontal plane containing the axes of rotation of said rear wheels, and is beneath the level of said pivotal connection which mounts said fork to said rigid structure whereby the center of gravity of the driver and vehicle is located at such a low level as to enhance its stability and prevent overturning.

2. A motor vehicle as recited in claim 1 including two foot rests on which a driver may place his two feet with his legs received at opposite sides of said forward portion of said rigid structure.

3. A motor vehicle as recited in claim 1 including two foot rests carried by said fork at opposite sides thereof and at locations spaced upwardly and rearwardly from the axis of rotation of said front wheel and positioned to support the two feet respectively of a driver when his legs are received at opposite sides of said forward portion of said rigid structure.

4. A motor vehicle as recited in claim 1 in which said steering means include a swinging steering arm structure connected to said fork for pivotal movement therewith about said inclined steering axis and projecting rearwardly from an opening in said forward portion of the body and having handle grip means to be held and be actuated by a driver for steering the front wheel.

5. A motor vehicle as recited in claim 1, including means forming a second seat behind said driver's seat having an upwardly facing seat surface on which a passenger sits behind the driver and which is at a level higher than said first mentioned seat surface and higher than said first horizontal plane.

6. A motor vehicle as recited in claim 1 including means forming a second seat behind said driver'seat and having an upwardly facing seat surface on which a passenger sits behind the driver and which is at a level higher than said first mentioned seat surface, there being a projection extending upwardly behind said driver's seat and in front of said second seat and defining the back of said front seat against which the driver may lean rearwardly, said projection extending upwardly higher than said upwardly facing surface of said second seat.

7. A motor vehicle as recited in claim 6, including a seat back projecting upwardly at the back of said second seat, and arm rests projecting upwardly at opposite sides of said second seat and upwardly beyond the level of said seat surface thereof.

8. A motor vehicle as recited in claim 1, including means forming a second seat behind said driver's seat and having an upwardly facing seat surface on which a passenger sits behind the driver and which is at a level higher than said first mentioned seat surface, and arm rests projecting upwardly at opposite sides of said second seat and upwardly beyond said seat surface thereof.

9. A motor vehicle as recited in claim 1, including means forming a second seat behind said driver's seat and having an upwardly facing seat surface on which a passenger sits behind the driver and which is at a level higher than said first mentioned seat surface, there being foot rests for a person in said second seat and located at opposite sides of and beneath said first seat.

10. A motor vehicle as recited in claim 1, including means forming a second seat behind said driver's seat and having an upwardly facing seat surface on which a passenger sits behind the driver and which is at a level higher than said first mentioned seat surface, there being an upwardly facing baggage support surface at a location behind said second seat.

11. A motor vehicle as recited in claim 1 in which said rigid structure is a frame, said vehicle including a body in addition to said frame and having a relatively wide rear portion overlying said rear portion of said rigid structure and said motor and located essentially laterally between said two rear wheels, and having a narrower portion of the body projecting forwardly from said rear portion thereof and centered essentially with respect to said two rear wheels and extending about and downwardly at opposite sides of said forwardly projecting portion of said rigid structure, said seat being formed at the upper side of said narrower forwardly projecting portion of the body and having a cushion defining said upwardly facing seat surface and defining a back for said seat against which the driver leans rearwardly, said forwardly projecting portion of the body having an upper surface which advances upwardly as it advances forwardly, said body having a forward portion at essentially the upper end of said fork and which is wider than said forwardly projecting narrower portion of the body and containing an opening through which said steering means are connected to the fork in steering relation, there being foot rests for the driver on which his feet may rest with his legs extending along opposite sides of said narrower portion of the body.

12. A motor vehicle comprising two rear wheels spaced laterally apart and having rims and tires mounted on the rims; a front wheel located forwardly of said rear wheels and essentially centered with respect thereto; a frame supported by said three wheels and having a rear portion between said two rear wheels; said frame having a forward portion which is narrow as compared with the spacing between said rear wheels and essentially centered with respect thereto and which extends forwardly and upwardly to a forward wheel mounting location; a fork carrying said front wheel rotatably; a pivotal connection mounting said fork to said forward portion of the frame at said wheel mounting location for pivotal steering movement about a steering axis; said fork and said steering axis being inclined downwardly and forwardly from said pivotal connection at which the fork is connected to said frame; steering means for turning said fork about said inclined steering axis; a seat supported on said frame at a location forwardly of said rear wheels and rearwardly of said front wheel and having an upwardly facing seat surface on which a driver may sit at a location to manipulate said steering means; said upwardly facing seat surface being so located that a person sitting thereon straddles said forward portion of the frame with his two legs received at opposite sides thereof; a motor carried by said frame at a location behind said seat and adapted to drive at least one of said rear wheels; and upwardly facing seat surface having a portion which is located at a level beneath a first horizontal plane containing the uppermost portions of said rims of the rear wheels, and closer to a second horizontal plane containing the axis of rotation of said rear wheels than to said first plane and beneath the level of said pivotal connection which mounts said fork to the frame; a body having a relatively wide rear portion overlying said rear portion of the frame and said motor and located essentially laterally between said two rear wheels, and having a narrower portion of the body projecting forwardly from said rear portion thereof and centered essentially with respect to said two rear wheels and extending about and downwardly at opposite sides of said forwardly projecting portion of the frame; and seat being formed at the upper side of said narrower forwardly projecting portion of the body and having a cushion defining said upwardly facing seat surface and defining a back for said seat against which the driver leans rearwardly; said forwardly projecting portion of the body having an upper surface which advances upwardly as it advances forwardly; said body having a forward portion at essentially the upper end of said fork and which is wider than said forwardly projecting narrower portion of the body and containing an opening through which said steering means are connected to the fork in steering relation; foot rests for the driver on which his feet may rest with his legs extending along opposite sides of said narrower portion of the body; a second seat carried by said relatively wide rear portion of the body at a location behind and higher than said first seat; said body forming an upwardly extending projection at essentially the juncture of said rear wide portion of the body and said forwardly projecting narrower portion defining a portion of the back of said first mentioned seat and projecting upwardly above the lowermost portion of said second seat at a location between the two seats; and foot rests for a person in said second seat located at opposite sides of said narrower forwardly projecting portion of the body and beneath said first seat.

13. A motor vehicle as recited in claim 12, in which said rear wide portion of the body has an upwardly facing baggage support surface behind said second seat and at a level above the lowermost portion thereof, said first mentioned foot rests being carried by said fork at opposite side thereof and at locations spaced upwardly and rearwardly from the axis of rotation of said front wheel.

14. A motor vehicle as recited in claim 12, including a seat back projecting upwardly at the back of said second seat, and arm rests projecting upwardly at opposite sides of said second seat.

* * * * *